United States Patent
Choi et al.

(10) Patent No.: US 9,686,362 B2
(45) Date of Patent: Jun. 20, 2017

(54) SMART ACCESS POINT AND METHOD FOR CONTROLLING INTERNET OF THINGS APPARATUS USING THE SMART ACCESS POINT APPARATUS

(71) Applicant: Korea Advanced Institute of Science and Technology, Daejeon (KR)

(72) Inventors: Jun Kyun Choi, Daejeon (KR); Jin Hong Yang, Daejeon (KR); Hyo Jin Park, Daejeon (KR); Yong Rok Kim, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 560 days.

(21) Appl. No.: 14/182,006

(22) Filed: Feb. 17, 2014

(65) Prior Publication Data

US 2015/0195365 A1 Jul. 9, 2015

(30) Foreign Application Priority Data

Jan. 7, 2014 (KR) .................. 10-2014-0001792

(51) Int. Cl.
*H04L 29/08* (2006.01)
*G06F 3/0482* (2013.01)
*H04W 4/00* (2009.01)
*H04W 4/02* (2009.01)

(52) U.S. Cl.
CPC ............ *H04L 67/16* (2013.01); *H04W 4/005* (2013.01); *H04W 4/021* (2013.01); *H04L 67/306* (2013.01)

(58) Field of Classification Search
CPC ..... H04L 67/16; H04L 67/306; H04L 63/105; H04L 67/30; H04W 4/021; H04W 4/005; G06F 9/5061; G06F 8/61; G06F 17/30705; G06F 3/16
USPC ......................................................... 709/223
See application file for complete search history.

(56) References Cited

U.S. PATENT DOCUMENTS

| | | | |
|---|---|---|---|
| 2012/0079092 A1* | 3/2012 | Woxblom | H04L 47/20 709/223 |
| 2014/0108943 A1* | 4/2014 | Lee | G06F 3/04817 715/738 |

* cited by examiner

*Primary Examiner* — Tu Nguyen
(74) *Attorney, Agent, or Firm* — Marshall, Gerstein & Borun LLP

(57) ABSTRACT

An access point and a method for controlling an IoT (Internet of Things) device, using the access point. The method includes receiving a request for a service list from a user terminal through a smart access point communication with one or more IoT devices provided in one space; providing a list of virtual objects which are able to be provided out of virtual objects corresponding to the one or more IoT devices to the user terminal as the service list; receiving a control service request generated from the service list of the user terminal; identifying an IoT device corresponding to the control service request and requesting the identified IoT device for IoT control; and renewing a state of a virtual object corresponding to the identified IoT device based on a response of the identified IoT device and transmitting information on the state renewal to the user terminal.

8 Claims, 17 Drawing Sheets

600

SMART ACCESS POINT AND METHOD FOR CONTROLLING INTERNET OF THINGS APPARATUS USING THE SMART ACCESS POINT APPARATUS

CROSS REFERENCE TO RELATED APPLICATION

This application claims priority from and the benefit of Korean Patent Application No. 10-2014-0001792, filed on Jan. 7, 2014, which is hereby incorporated by reference for all purposes as if fully set forth herein.

BACKGROUND OF THE DISCLOSURE

Field of the Disclosure

Exemplary embodiments of the disclosure relate to a smart access point apparatus and a method for controlling an IoT (Internet of Things) apparatus using the smart access point apparatus.

Discussion of the Background

Internet of Things (namely, IoT) is a new form evolving from conventional USN (Ubiquitous Sensor Network) or M2M (Machine to Machine). A main object of conventional M2M is the communication of end-devices with humans. A main object of IoT is to enable communication of things such as telephones, books, thermometers with humans. Specifically, the IoT may mean a things-space internet network which cooperatively forms intelligent relations among three diverse environmental factors including people, things and services, without human explicit intervention.

Besides such IoT, various concepts and technologies such as WoT (Web of Things) and WoO (Web of Objects) are under study and development. With development and distribution of such concepts and technologies, it is expected that use of devices (e.g., gadget devices, sensor devices and actuators) giving users easy access to the internet will increase.

As the IoT environment has come, there is a growing need to introduce a service for controlling various IoT devices in a specific spatial environment. For instance, a user has to control setting for temperatures, ventilation, luminance, sound and the like based on a purpose of use, in case of a conference room in a smart building.

FIG. 1 is a diagram illustrating an IoT environment in a prior art. It is shown in FIG. 1 that various IoT devices are provided in a specific spatial environment. At this time, a user 120 can control special services after accessed to special services associated with a smart lightening through a device possessed by the user 120 to control an IoT device such as a smart lightening.

However, in the prior art, each of spatial environments are provided (e.g., a home, an office, a conference room and the like). Considering that various IoT devices are provided in each of the spatial environments, it is quite inconvenient for users to access to each of the special services provided to each of the IoT devices.

Moreover, there are only closed and vertical relations between the user's device and each of the IoT devices but insufficient information about the space of the devices. For instance, the prior art uses only a relation between a first IoT device and the user's device and a relation between a second IoT device and the user's device, failing to recognize whether the first IoT device and the second IoT device are provided in the same space (e.g., one of offices). However, the associated and/or integrated control for an air conditioner and a humidifier is required in one space, for instance.

SUMMARY OF THE DISCLOSURE

Exemplary embodiments of the present disclosure provide a smart access point apparatus capable of controlling IoT devices provided in a corresponding space based on association and integration of IoT devices with a space, and a method for providing a service using the smart access point apparatus.

Additional features of the present disclosure will be set forth in the description which follows, and in part will be apparent from the description, or may be learned by practice of the disclosed subject matter.

Exemplary embodiments of the present disclosure disclose a method for providing a service in an IoT (Internet of Things) environment including receiving a request for a service list from a user terminal through a smart access point communication with one or more IoT devices provided in one space; providing a list of virtual objects which are able to be provided out of virtual objects corresponding to the one or more IoT devices to the user terminal as the service list; receiving a control service request generated from the service list of the user terminal; identifying an IoT device corresponding to the control service request and requesting the identified IoT device for IoT control; and renewing a state of a virtual object corresponding to the identified IoT device based on a response of the identified IoT device and transmitting information on the state renewal to the user terminal.

The service list may be provided to the user terminal through a web page comprising icons corresponding to the virtual object, and the information on the state renewal is provided to the user terminal through the web page in relation with the icons.

Exemplary embodiments of the present disclosure also disclose a method for providing a service in an IoT (Internet of Things) environment including transmitting space IoT control information to a linked user terminal through a smart access point communicating with one or more IoT devices provided in one space; receiving a space IoT control service request comprising intent information from the user terminal, when intent information matched with a user's intent is identified in the user terminal based on the space IoT control information; identifying an IoT device corresponding to the received space IoT control service request out of the one or more IoT devices and requesting the identified IoT device for IoT control based on the intent information; and renewing a state of a virtual object corresponding to the identified IoT device based on a response from the identified IoT device and transmitting information on the state renewal to the user terminal, wherein the space IoT control information comprises a list of intent information comprising control information and address information for the one or more IoT devices.

The intent information may be matched with a corresponding one on the intent information list based on the user's intent, and the user's intent may be generated based at least on the user's input to the user terminal.

Exemplary embodiments of the present disclosure also disclose a method for providing a service in an IoT (Internet of Things) environment including transmitting space IOT call information to a linked user terminal through a smart access point communicating with one or more IoT devices provided in one space; receiving the user intent information transmitted based on the space IoT call information from the user terminal; interpreting the user intent information and identifying an IOT device matched with the user intent information out of the one or more IoT devices; requesting the identified IoT device for IoT control based on the user intent information; and renewing a state of a virtual object corresponding to the identified IoT device based on a response of the identified IoT device and transmitting the state renewal information to the user terminal, wherein the space IoT call information comprises information on an address calling intent information and information on a parameter type required by the calling of the intent information, and the user intent information comprises intent information called through the address.

The user intent information may be interpreted based on ontology and/or semantic schema according to characteristics of the called intent information.

Exemplary embodiments of the present disclosure also disclose a method for providing a service in an IoT (Internet of Things) environment including requesting a linked user terminal for a user profile through a smart access point communicating with one or more IoT devices provided in one space; receiving the user profile from the user terminal; identifying an IoT device corresponding to result of the user profile analysis out of the one or more IoT devices and requesting the identified IoT device for IoT control; and renewing a state of a virtual object corresponding to the identified IoT device based on a response from the identified IoT device.

The virtual object as an instance representing a corresponding IoT device may be deployed in the smart access point based on a request made by a manager of the smart access point.

The method for providing the service in the IoT (Internet of Things) environment may further include broadcasting information on whether an instance of the virtual object is operated and whether the IoT control function is provided.

The method for providing the service in the IoT (Internet of Things) environment may further include logging a state of the virtual object, when a state of the virtual object is changed.

Exemplary embodiments of the present disclosure also disclose a smart access point in an IoT (Internet of Things) including a service list requesting receiving unit configured to receive a request of a service list for one or more IoT devices provided in one space from a user terminal; a service list providing unit configured to provide the user terminal with a list of virtual objects corresponding to the one or more IoT devices which can be provided as the service list; a control service request receiving unit configured to receive a control service request generated through the service list of the user terminal; an IoT control requesting unit configured to identify an IoT device corresponding to the control service request out of the one or more IoT devices and to request the identified IoT device for IoT control; and a virtual object managing unit configured to renew a state of the virtual object corresponding to the identified IoT device based on a response from the identified IoT device and send information on the state renewal to the user terminal.

The service list may be provided to the user terminal through a web page comprising icons corresponding to the virtual object, and the information on the state renewal may be provided to the user terminal through the web page in relation with the icons.

Exemplary embodiments of the present disclosure also disclose a smart access point in an IoT (Internet of Things) environment including a space IoT control information transmitting unit configured to transmit to user terminal information for space IoT control of one or more IoT devices provided in one space; a IoT control requesting unit configured to identify a corresponding IoT device to the request for a space IoT control service received from the one or more IoT devices and to request the identified IoT device for IoT control based on the intent information; a virtual object state managing unit configured to renew a state of a virtual object corresponding to the identified IoT device based on a response from the identified IoT device and to send information on the state renewal to the user terminal, wherein the space IoT control information comprises a list of intent information comprising control information and address information for the one or more IoT devices.

The intent information may be matched with a corresponding one from the list of the intent information based on the user's intent, and the user's intent is generated based at least one the user's input to the user terminal.

Exemplary embodiments of the present disclosure also disclose a smart access point in an IoT (Internet of Things) environment including a space IoT call information transmitting unit configured to transmit space IoT call information associated with one or more IoT devices provided in one space to a user terminal; a user intent information receiving unit configured to receive user intent information transmitted from the user terminal based on space IoT call information; a IoT device identifying unit configured to interpret the user intent information and to identify an IoT device matched with the user intent information out of the one or more IoT devices; a IoT control requesting unit configured to request the identified IoT device for IoT control based on the user intent information; and a virtual object state managing unit configured to renew a state of a corresponding virtual object to the identified IoT device in a response from the identified IoT device and to transmit information on the renewal of the state to the user terminal, wherein the space IoT call information comprises information on an address calling intent information and information on a parameter type required by the calling of the intent information, and the user intent information comprises information on the intent called from an address having the space IoT call information.

The user intent information may be interpreted based on ontology and/or semantic schema according to characteristics of the called intent information.

Exemplary embodiments of the present disclosure also disclose a smart access point in an IoT (Internet of Things) environment including a user profile requesting unit configured to request a linked user terminal for a user profile; a user profile receiving unit configured to receive the user profile from the user terminal; an IoT control requesting unit configured to identify a corresponding IoT device to a result of user profile analysis out of one or more IoT devices provided in one space and to request the identified IoT device for IoT control; and a virtual object state managing unit configured to renew a state of a virtual object corresponding to the identified IoT device based on a response sent from the identified IoT device.

According to the exemplary embodiments of the disclosure, the sample inflow may be sensed based on change in the capacitances, not based on the direct reaction with the electrode. Accordingly, the influence of the electric reaction generated by the sample inflow on the sample measurement may be reduced as much as possible and the accuracy of the measurement result may be improved.

It is to be understood that both the foregoing general description and the following detailed description are exemplary and explanatory and are intended to provide further explanation of the disclosed subject matter as claimed.

BRIEF DESCRIPTION OF THE DRAWINGS

The accompanying drawings, which are included to provide a further understanding of the disclosed subject matter and are incorporated in and constitute a part of this specification, illustrate exemplary embodiments of the disclosed subject matter, and together with the description serve to explain the principles of the disclosed subject matter.

DETAILED DESCRIPTION OF THE ILLUSTRATED EMBODIMENTS

Figure 1:
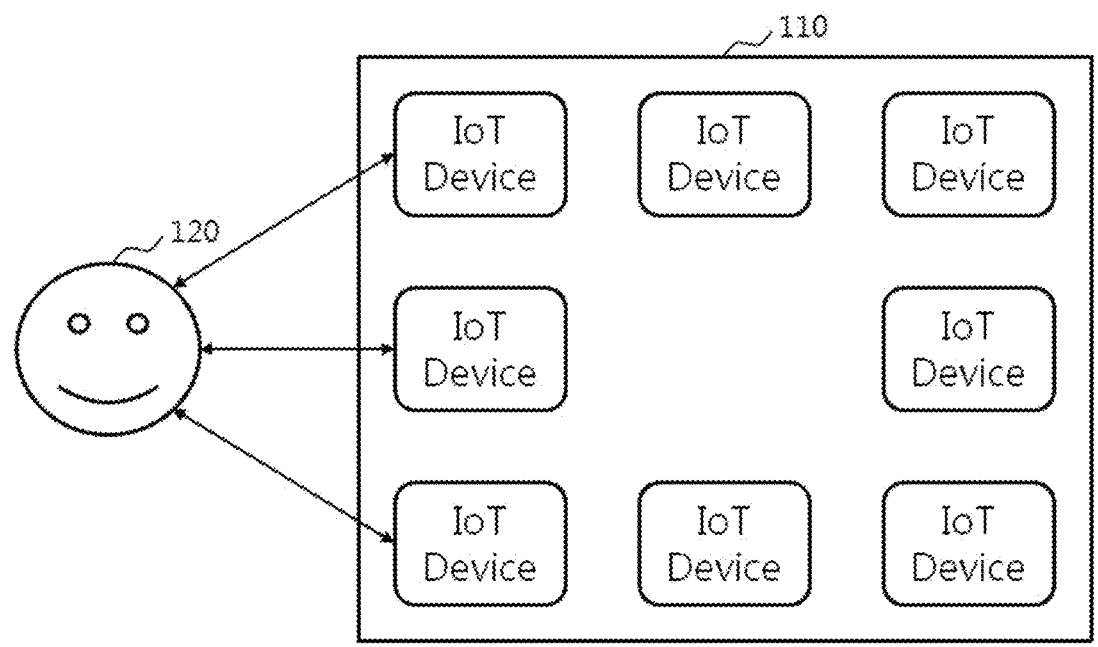
FIG. 1 is a diagram illustrating an IoT environment according to the prior art.

Exemplary embodiments of the disclosed subject matter are described more fully hereinafter with reference to the accompanying drawings. The disclosed subject matter may, however, be embodied in many different forms and should not be construed as limited to the exemplary embodiments set forth herein. Rather, the exemplary embodiments are provided so that this disclosure is thorough and complete, and will convey the scope of the disclosed subject matter to those skilled in the art. In the drawings, the size and relative sizes of layers and regions may be exaggerated for clarity. Like reference numerals in the drawings denote like elements.

It will be understood that when an element or layer is referred to as being "on", "connected to", or "coupled to" another element or layer, it can be directly on, connected, or coupled to the other element or layer or intervening elements or layers may be present. In contrast, when an element is referred to as being "directly on", "directly connected to", or "directly coupled to" another element or layer, there are no intervening elements or layers present. As used herein, the term "and/or" includes any and all combinations of one or more of the associated listed items. It may also be understood that for the purposes of this disclosure, "at least one of X, Y, and Z" can be construed as X only, Y only, Z only, or any combination of two or more items X, Y, and Z (e.g., XYZ, XYY, YZ, ZZ).

It will be understood that, although the terms first, second, third etc. may be used herein to describe various elements, components, regions, layers, and/or sections, these elements, components, regions, layers, and/or sections should not be limited by these terms. These terms are only used to distinguish one element, component, region, layer, or section from another region, layer or section. Thus, a first element, component, region, layer, or section discussed below could be termed a second element, component, region, layer, or section without departing from the teachings of the present disclosure.

The terminology used herein is for the purpose of describing exemplary embodiments only and is not intended to be limiting of the disclosed subject matter. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Exemplary embodiments of the disclosed subject matter are described herein with reference to cross-section illustrations that are schematic illustrations of idealized embodiments (and intermediate structures) of the disclosed subject matter. As such, variations from the shapes of the illustrations as a result, for example, of manufacturing techniques and/or tolerances, are to be expected. Thus, exemplary embodiments of the disclosed subject matter should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this disclosed subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the disclosed subject matter will be described in detail with reference to the accompanying drawings.

Figure 2:
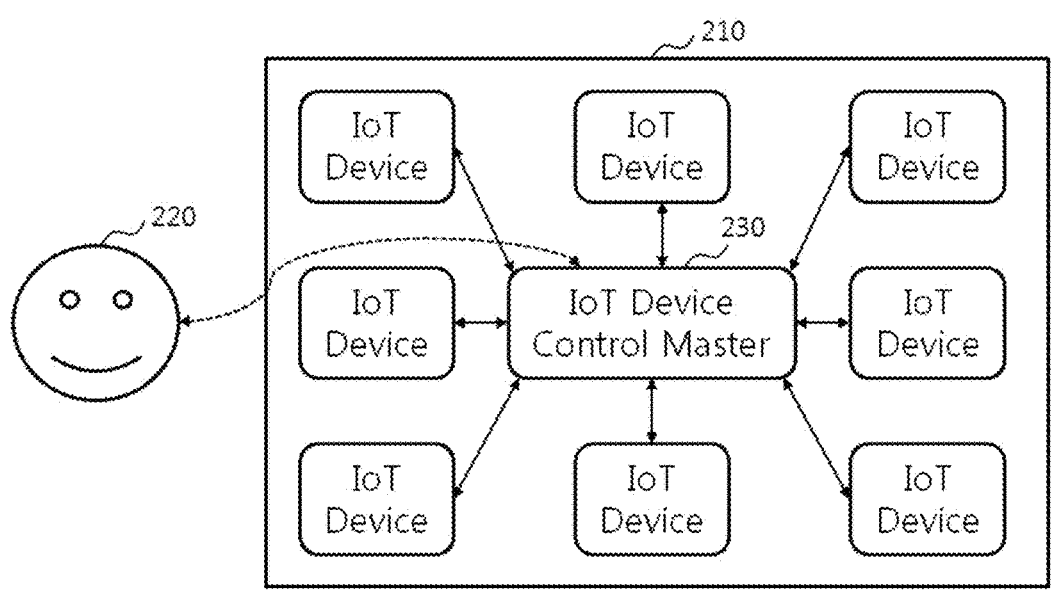
FIG. 2 is a diagram illustrating an IoT environment according to exemplary embodiments of the disclosure.

FIG. 2 is a diagram illustrating an IoT environment according to the exemplary embodiments of the disclosure.

It is shown in FIG. 2 that various IoT devices are provided in a specific spatial environment 210. At this time, a user 220 may access a IoT device control master 230 further provided in the specific spatial environment 210, not accessing services provided in each of the IoT devices in the prior art, using a user's device.

The IoT device control master 230 may provide the user 220 with a service for controlling IoT devices provided in a corresponding space through the user's device. For that, the IoT device control master 230 shown in FIG. 2 can communicate with various IoT devices provided in a specific space environment 210.

A computing environment of things requires an access point for accessing a device of things provided in a specific space to access a device of things provided in a specific space to a computing environment of things. The access point has to support access of the various IoT devices. To support the access, a computing environment of things for controlling and virtualizing a device of things (or an IoT device) may be required in environments such as IoT (Internet of things), WoT (Web of Things) and WoO (Web of Objects), besides a network access device. For instance, the computing environment of things may mean an environment for virtualizing and driving each of the IoT devices.

The exemplary embodiments of the disclosure describe a method and a system for directly driving and controlling IoT devices accessed by a smart access point such as the IoT device control master 230 shown in FIG. 2. The access point needs to be converted into a smart access point apparatus as a service execution environment of accessed IoT devices, not simply as a network access passage. VO (Virtual Object) of various things (e.g., the IoT devices shown in FIG. 2) may be implemented on a smart access point and a user (e.g., the user 220 shown in FIG. 2) may control the IoT devices through interworking with a desired virtual object.

Accordingly, the user needs a method of how controlling a desired IoT after accessing a smart access point provided in a specific space.

As mentioned hereinabove, the smart access point may be a device for providing a service of accessing an IoT device at a one-hop distance and driving the IoT devices virtualized as virtual objects. Such the smart access point may include an interface for communicating with various IoT devices, using various interworking protocols such as WLAN (Wireless Local Area Network), Zigbee, Bluetooth, Z-wave, Ethernet, RS232 and the like.

Figure 3:
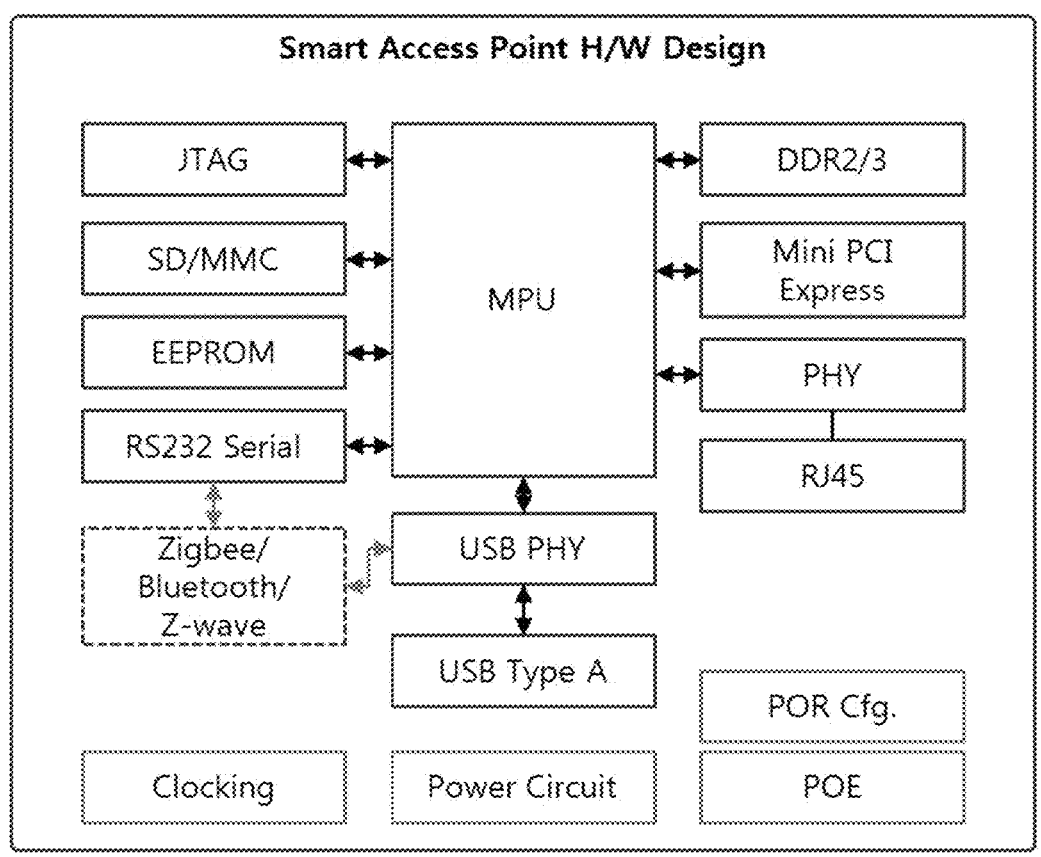
FIG. 3 is a diagram illustrating one embodiment of a hardware configuration provided in a smart access point apparatus according to exemplary embodiments of the disclosure.

FIG. 3 is a diagram illustrating one embodiment of a hardware configuration provided in a smart access point according to the exemplary embodiments of the disclosure. FIG. 3 shows MPU (Micro MPU(Micro Processor Unit), JTAG(Joint Test Action Group), SD/MMC(Secure Digital/Multi-Media Card), EEPROM(Electrically Erasable and Programmable Read-Only Memory), RS232 Serial, Zigbee/Bluetooth/Z-wave, USB PHY, USB Type A, DDR2/3, Mini PCI(Peripheral Component Interconnect) Express, PHY, RJ45, Clocking, Power Circuit, POR(Power On Reset), Cfg(Configuration) and POE(Power Over Ethernet). Each of elements is well-known in the art to which the disclosure pertains and detailed description thereof is omitted accordingly. FIG. 3 illustrates one embodiment of a hardware configuration provided in the smart access point. The smart access point may further include elements not shown in FIG. 2 or a predetermined number of elements may be omitted. Or, combination of two or more elements may be configurated or arranged.

Figure 4:
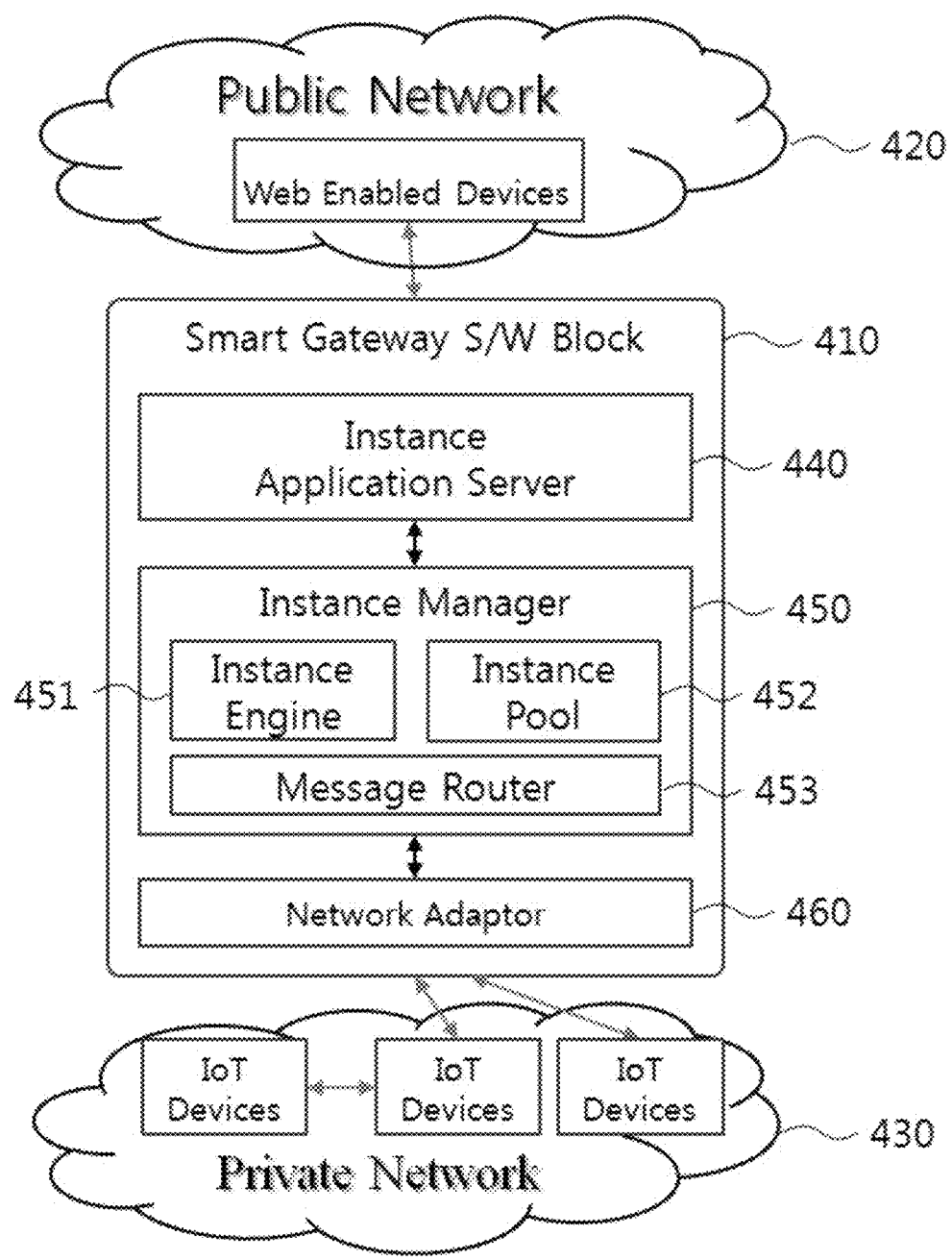
FIG. 4 is a diagram illustrating another embodiment of a hardware configuration provided in a smart access point apparatus according to exemplary embodiments of the disclosure.

FIG. 4 is a diagram illustrating one embodiment of a network configuration provided in the smart access point according to the exemplary embodiments of the disclosure. FIG. 4 shows a smart gateway S/W block 410 as the smart access point. The smart access point is arranged in the same position as a conventional wireless access point such that it may have two access properties of a public network 420 and a private network 430. When seen outdoors, the smart access point may be recognized as a subject of information management and access to a specific space (in other words, a space accessible to a smart access point). When seen indoors, it may be recognized as a bridge between accessed devices.

In case of a private network 430 connected with the IoT devices, the smart access point may provide various network interfaces and adaptor functions to access the IoT devices in a one-hop distance such that presence of corresponding IoT device access, an intensity of a signal for the corresponding IoT device can be explicitly recognized. Accordingly, the smart access point may provide a mutual network adaptation function when the IoT devices having different protocols loaded therein are in D2D (Device to Device) or P2P (Peer to Peer) communication with each other. Moreover, the smart access point may detect information about one-hop distances and implement a function of simultaneous interworking control. Each of specific IoT devices need not requires a high intelligence to provide a D2D function and the IoT devices can be controlled less expensively.

The smart gateway software block 410 may include an instance application service 440, an instance manager 450 and a network adaptor 460.

The instance application server 440 may be operated as WAS (Web Application Server) and provide web accessible devices of the public network 420 with services associated with the IoT devices, using a web interface.

The instance manager 450 may be a main module associated with generation and driving of instances and manage/schedule a life cycle of an instance. The instance manager 450 may include an instance engine 451 for providing an instance operation environment, an instance pool 452 for pooling the instance and a message router 453 for routing an input/output message associated with the IoT devices.

The network adaptor 460 may provide a function of a physical access to the IoT devices through a wire or wirelessly based on network interface specifications supported by the smart access point. For instance, the network adaptor 460 may provide an adaptor function for network interworking, using various communication protocols. Examples of the various communication protocols may include WLAN (Wireless Local Area Network), Zigbee, Bluetooth, Z-wave, Ethernet, RS232 serial and the like. The network adaptor 460 may further provide a message parsing function for processing a message based on each of the network interface specifications. In the IoT environment, the IoT devices use various message formats based on characteristics thereof. Accordingly, when using NF network interface technologies, the network adaptor 460 may further provide a function of structuralizing message data sent from the IoT devices based on a format for each instance according to the characteristic of the specific network interface.

Figure 5:
FIG. 5 is a diagram illustrating one embodiment of an IoT application list screen according to exemplary embodiments of the disclosure.
Figure 6:
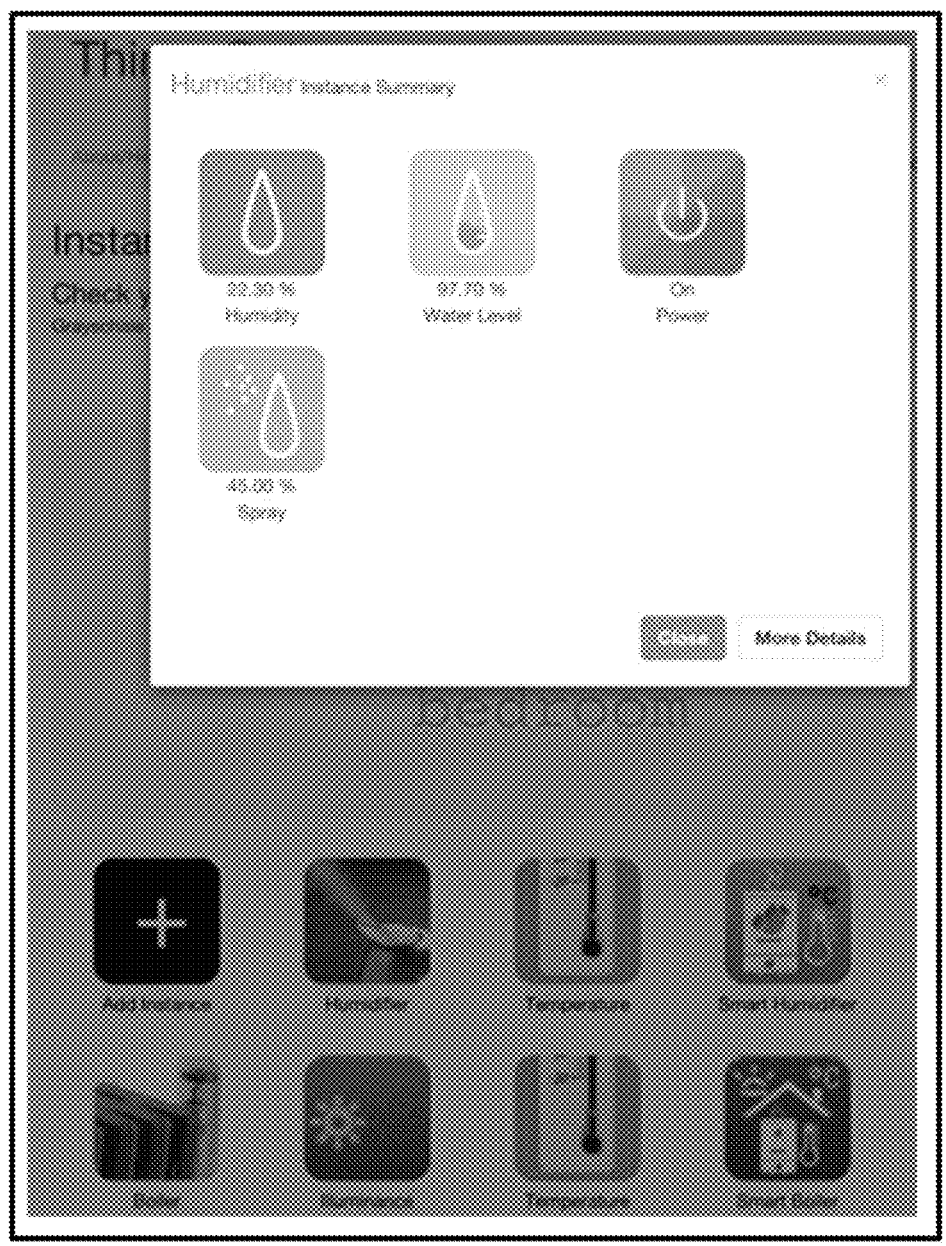
FIG. 6 is a diagram illustrating one embodiment of an IoT application implementation screen according to exemplary embodiments of the disclosure.

FIG. 5 is a diagram illustrating one embodiment of an IoT list screen according to the exemplary embodiments of the disclosure. FIG. 6 is a diagram illustrating one embodiment of an IoT application implementation screen according to the exemplary embodiments of the disclosure. To access the smart access point to the IoT devices, a virtual object of the specific IoT device has to be deployed on an instance manager of the smart access point. The deployed virtual object may represent the specific IoT device. The virtual object may be divided into a device linkage type and a mesh up type. The device linkage type virtual object may mean a virtual object directly linked to one or more IoT devices. The mesh up type virtual object may mean a virtual object linked with one or more device linkage type virtual object. The virtual object provided on the instance manager may be an instance and instances may be managed on the instance manager. The user may use a service through a web or a private web to use and control various instances driven on the smart access point. At this time, the virtual objects shown in FIGS. 5 and 6 may be registered as icon types. In this instance, each of the IoT devices may be provided as an application icon. FIG. 5 shows one embodiment of a screen providing the user with a list of application (App.) icons. FIG. 6 shows one embodiment of a screen implementing an application associated with a humidifier by the user's selection of an icon associated with a humidifier.

Figure 7:
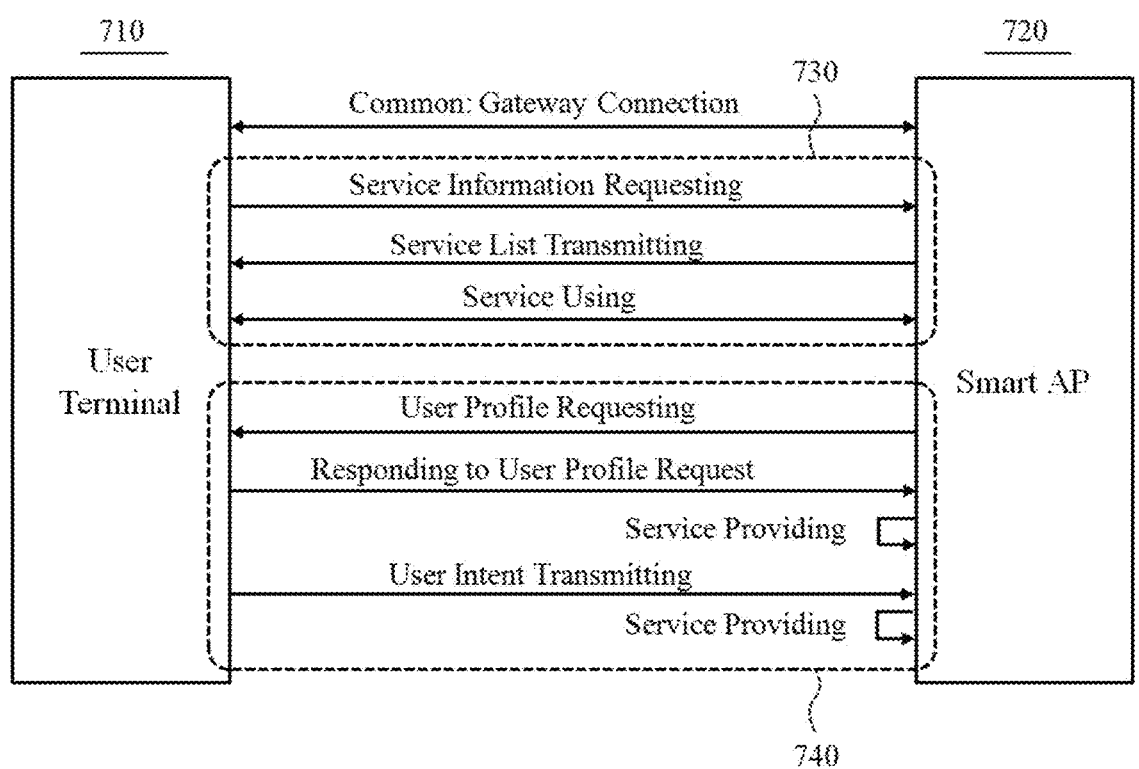
FIG. 7 is a diagram illustrating one embodiment of a method for providing a service according to exemplary embodiments of the disclosure.

FIG. 7 is a diagram illustrating one embodiment of a method for providing a service according to exemplary embodiments of the disclosure. FIG. 7 shows a method of providing a service to a user terminal 710 and a smart access point 720. At this time, a service providing method may be divided into two methods.

In one of the two methods, the user terminal may access the smart access point 720 and receives a list of virtual objects for useable IoT devices, so as to control the IoT devices individually. As shown in a first dotted box 730 shown in FIG. 7, the method may include a first step for the user terminal 710 requesting the smart access point 720 for information about a service, a second step for the smart access point 720 sending the service list to the user terminal 710 and a third step for the user terminal 710 using a corresponding service through the smart access point 720.

In the other method, the smart access point 720 requests the user terminal linked wirelessly for a service profile and provides services actively. As shown in a second dotted box 740 shown in FIG. 7, the method may include a first step for the smart access point 720 requesting the user terminal 710 for the user profile, a second step for the user terminal 710 responding to the user profile requested by the smart access point 720, a third step for the smart access point 720 providing services actively based on the user profile, a fourth step for the user terminal 710 transmitting a user intent to the smart access point 720 and a fifth step for the smart access point 720 providing services actively based more on the user intent.

Figure 8:
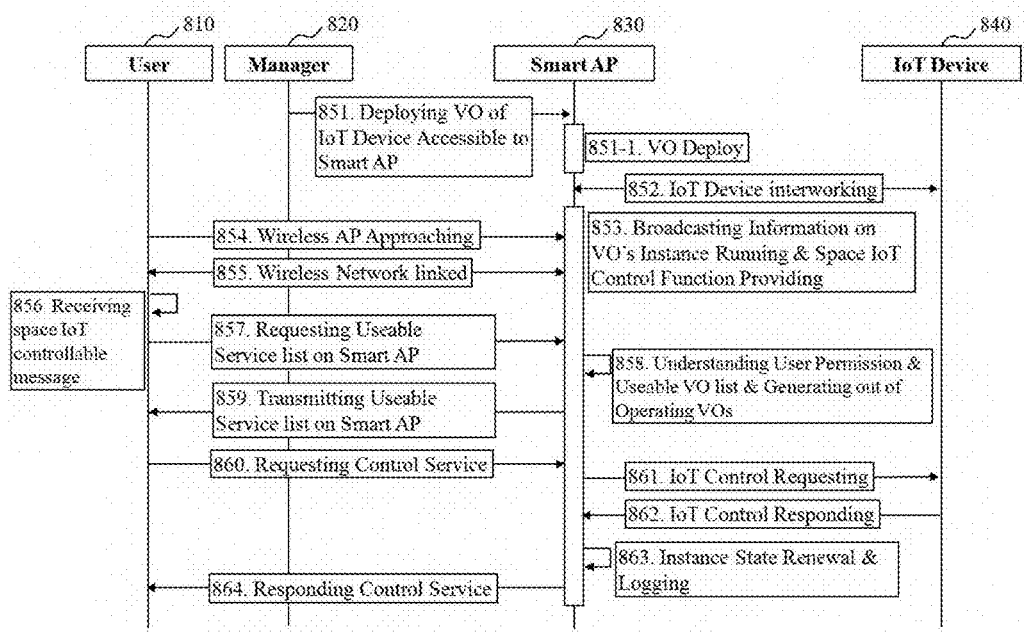
FIG. 8 is a diagram illustrating one embodiment of a method for providing a service, using a service list, according to exemplary embodiments of the disclosure.

FIG. 8 is a diagram illustrating one embodiment of a method for providing a service, using a service list, according to exemplary embodiments of the disclosure. FIG. 8 shows a user 810, a manger 820, a smart access point 830 (Smart AP) and an IoT device 840 (IoT Device). The user 810 and the manager 820 may be the same subject or different objects. Substantially, the user 810 and the manager 820 may be devices used to access the smart access point 830. A plurality of IoT devices 840 may be provided.

A device possessed by the user 810 accesses the smart access point 830 and checks presence of a service provided by the smart access point 830. In case that the smart access point 830 provides a service associated with the IoT devices 840, the user's device may be notice whether the service is usable. For instance, the access between the user's device and the smart access point 830 may be web-based.

In a step 851, the manager 820 may deploy a virtual object (VO) of an IoT device 840 accessible to the smart access point 830 in the smart access point 830. For instance, the manager 820 may approach the smart access point 830 and implement the deployment of the virtual object. The smart access point 830 may deploy the virtual object in a step 851-1.

In a step 852, the smart access point 830 may implement interworking with the IoT device 840. At this time, the IoT device 840 may interwork with a corresponding virtual object deployed in the smart access point 830.

In a step 853, the smart access point 830 may broadcast information on instance running of the virtual object and presence of a space IoT control function. For instance, the smart access point 830 may broadcast a message (or a space IoT controllable message which will be described later) containing information on providing of the functions mentioned above to linked terminals.

In a step 854, the user 810 may approach the smart access point 830 wirelessly. In a step 855, a wireless network may be connected between the user 810 and the smart access point 830.

In a step 856, the user 810 may receive a space IoT controllable message. Here, the space IoT controllable message may be corresponding to the message broadcasted by the smart access point 830 in the step 853.

In a step 857, the user 810 may request the smart access point 830 for a list of services useable on the smart access point 830.

In a step 858, the smart access point 830 may grasp the user's permissions and create a list of virtual objects which can be provided among operating virtual objects.

In a step 859, the smart access point 830 may transmit the list of the services useable on the smart access point 830.

In a step 860, the user 810 may request the smart access point 830 for a control service. For instance, in a step 9, the service list shown in FIG. 5 may be provided to the user 810 as an icon type representing the virtual objects of the IoT device 840. The user 810 may request the smart access point 830 for a control service to control the IoT device 840, using the provided icon shown in FIG. 6.

In a step 861, the smart access point 830 may request the IoT devices 840 for IoT control. In a step 862, the IoT devices 840 may respond to the smart access point 830 for the IoT control. For instance, when the IoT device 840 is a boiler or a device for controlling a boiler, the control service requested by the user 810 may be a control service for heightening a setting temperature of a boiler. At this time, the smart access point 830 may request the IoT device 840 to heighten a setting temperature of the boiler (the IoT control request). The IoT device 840 may heighten a setting temperature of the boiler based on the IoT control request and respond to the smart access point 830 (IoT control response) in a step 862.

In a step 863, the smart access point 830 may renew or log an instance state. For instance, when the IoT device 840 heightening the setting temperature of the boiler from 15° C. to 18° C. based on a request, the smart access point 830 may renew a state of an instance corresponding to the IoT device 840 and change a current setting temperature into 18° C., such that such change of the setting temperature can be recorded for logging.

In a step 864, the smart access point 830 may respond to the user for the control service. For instance, the smart access point 830 may notice to the user 810 that the setting temperature of the boiler is changed into 18° C.

Figure 9:
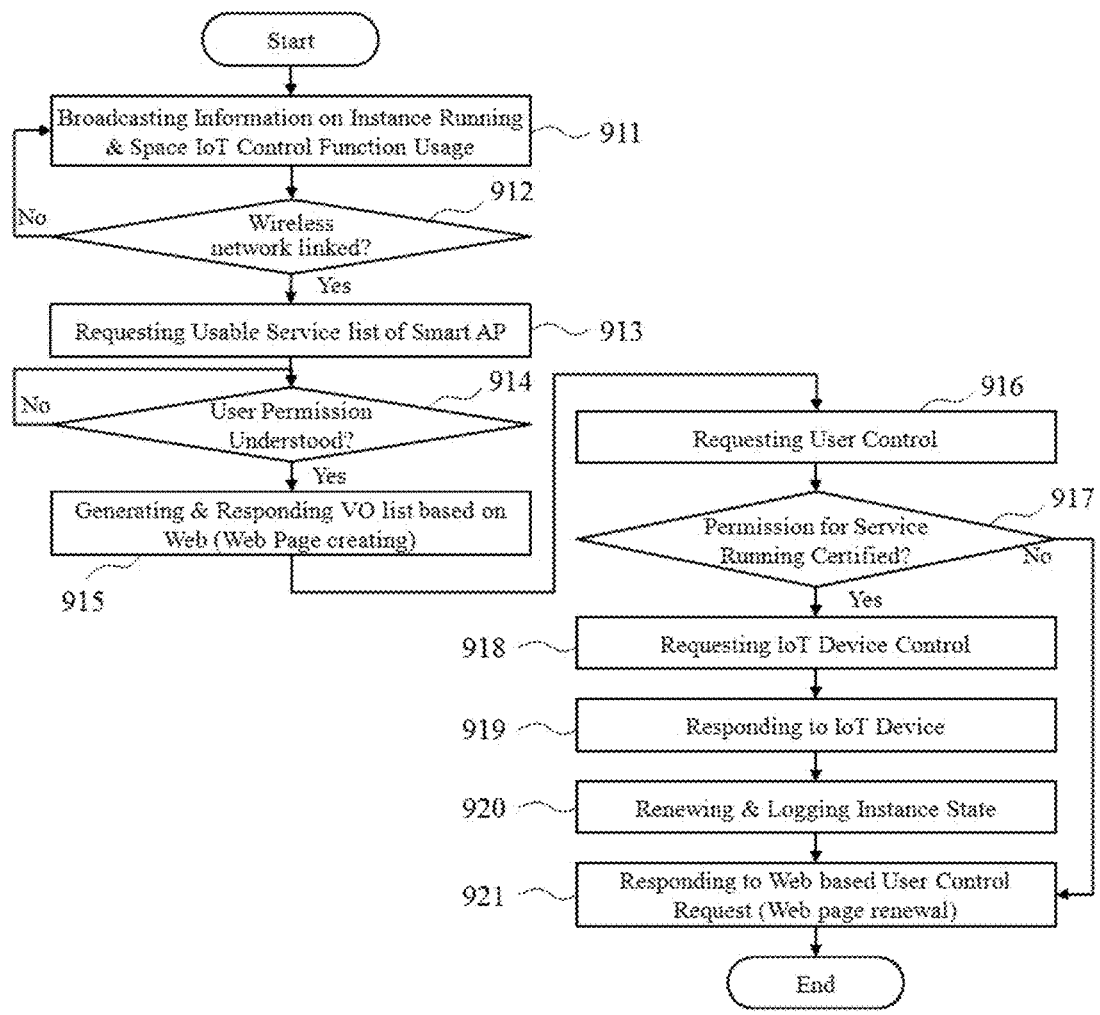
FIG. 9 is a diagram illustrating one embodiment of an operation process for a method for providing a web-based service according to exemplary embodiments of the disclosure.

FIG. 9 is a diagram illustrating one embodiment of an operation process for a method for providing a web-based service according to exemplary embodiments of the disclosure.

In a step 911, a smart access device may broadcast information on instance running (information on whether an instance is implementing) and information on usage of a space IoT control function.

In a step 912, the smart access point checks whether a user terminal is linked to a wireless network. When the user terminal is linked, the smart access point may implement a step 913. When the user terminal is not linked, the smart access point may re-implement the step 911.

In a step 913, the user terminal may request a list of services useable on the smart access point. For instance, the user terminal is linked to a wireless network and then it may request a service list of the smart access point through a redirection function.

In a step 914, the smart access point may grasp the user's permissions and implement a step, once the user's permissions are grasped.

In a step 915, the smart access point may create a list of virtual objects which can be provided based on a web and respond (create a web page). For instance, the smart access point may provide an URL accessible to the created web page to the user terminal.

In a step 916, the user terminal may request the smart access point for user control. Such the request of the user terminal may be generated through a web page on the web directly.

In a step 917, the smart access point may implement a step 918 or a step 921 based on the permissions of the user's service implementation. For instance, when the user's permissions for running the service are certified, a step 918 may be performed. When the user's permissions for running the service are not certified, a step 921 may be performed.

In the step 918, the smart access point may request the IoT device for control. For instance, the smart access point may generate a request message for controlling the IoT device based on the user control requested from the user terminal and send the generated message to the IoT device.

In a step 919, the IoT device may respond to the request of the smart access point. For instance, the IoT device may perform an operation according to the request of the smart access device and send a responding message containing the result of the operation to the smart access point.

In a step 920, the smart access point may perform renewal and logging of an instance state.

In a step 921, the smart access point may respond to the request of the user control based on a web (renew a web page). For instance, the smart access point may renew information on the state of the instance which is the information associated with the IoT device provided to the user through the web page, such that changed information based on the request of the user control may be provided to the user. Alternatively, the smart access point may notice to the user that there are no permissions for implementation through the web page, when the user's permissions for service implementation are not certified.

Figure 10:
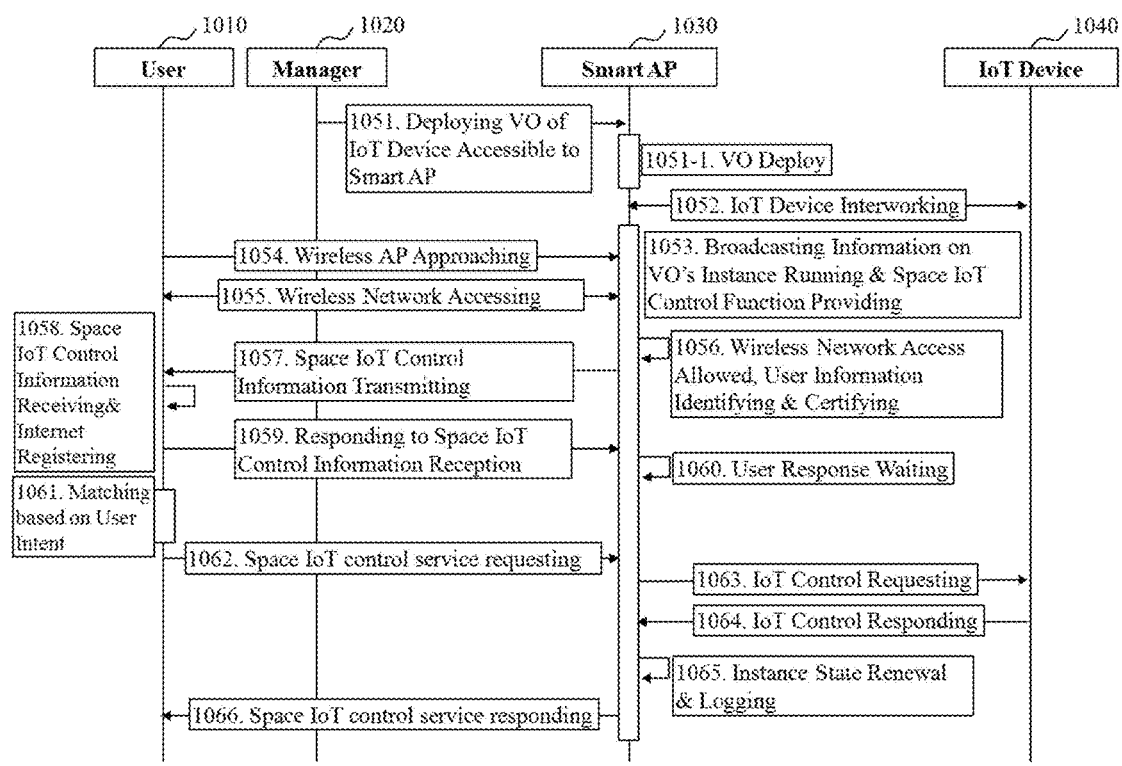
FIG. 10 is a diagram illustrating one embodiment of a method for providing an intent-based service according to exemplary embodiments of the disclosure.

FIG. 10 is a diagram illustrating one embodiment of a method for providing an intent-based service according to exemplary embodiments of the disclosure. FIG. 10 shows a user 1010, a manager 1020, a smart access point (Smart AP, 1030) and an IoT device (IoT Device, 1040). The user 1010 and the manager 1020 may be the same subject or different subjects. Substantially, the user 1010 and the manager 1020 may mean the device used in accessing the user 1010 and the manager 1020 to the smart access point 1030. A plurality of IoT devices 1040 may be provided.

A method for providing services according to this embodiment may interpret and process the user's intent for a device possessed by the user 1010 or a space IoT environment on the services. The user's device access the smart access point 1030 and receive a list of accessible intents from the smart access point 1030. When intent is generated in the user device based on list of the intents, the user device may send a service control request to the smart access point 1030. The smart access point 1030 may process the user's service control request, with interworking with the IoT devices 1040. As mentioned hereinabove, "intent" used in the specification may mean the data including attributes, actions, types and/or values for identifying and/or controlling the IoT devices based on the users' intents.

In a step 1050, the manager 1020 may deploy a virtual object (VO) of an IoT device 1040 accessible to the smart access point 1030 in the smart access point 1030. For instance, the manager 1020 may approach the smart access point 1030 to progress the deployment of the virtual object. The smart access point 1030 may deploy the virtual object in a step 1051-1.

In a step 1052, the smart access point 1030 may progress the interworking with the IoT device 1040. At this time, the IoT device 1040 may interwork, corresponding to the virtual object deployed on the smart access point 1030.

In a step 1053, the smart access point 1030 may broadcast instance running of the virtual object and information on the presence of the space IoT control function. For instance, the smart access point 1030 may broadcast a message containing the information on the presence of the functions mentioned hereinabove (a space IoT controllable message which will be described later) to the linked terminals.

In a step 1054, the user 1010 may access the smart access point 1030 wirelessly. In a step 1055, a wireless network may be connected between the user 1010 and the smart access point 1030.

In a step 1056, the smart access point 1030 may allow the user 1010 to access the wireless network and identify and certify the user information.

In a step 1057, the smart access point 1030 may send information for space IoT control to the user 1010. The information for the space IoT control may be a list of information associated with the IoT device 1040 and intents including addresses and authenticators.

In a step 1058, the user 1010 may receive the information for controlling the space IoT from the smart access point 1030 and register the intents.

In a step 1059, the user 1010 may respond to the smart access point 1030 with respect to the reception of the information for controlling the space IoT.

In a step 1060, the smart access point 1030 may wait for the response from the user.

In a step 1061, the user 1010 may perform matching based on the user's intent. For instance, for the user's intent to heighten a stetting temperature of a boiler, the user 1010 (substantially a device possessed by the user 1010 as mentioned hereinabove) may search for an intent matching the user's intent out of registered intents. At this time, the user's intent may be determined based on the user's current input or the user's former input (e.g., schedule information).

In a step 1062, the user 1010 may request for a space IoT control service. For instance, the user 1010 may send a message for requesting the space IoT control service (e.g., message containing information of "heighten a setting temperature of the boiler managed by the IoT device 1040 by 3° C.) to the smart access point 1030, using the control information including the intent matched in the step 1061, the addresses and the authenticators.

In a step 1063, the smart access point 1030 may request the IoT device 1040 for IOT control. In a step 1064, the IoT device 1040 may respond to the IoT control of the smart access point 1030. For instance, when the IoT device 1040 is a boiler or a device for controlling a boiler, the smart access point 1030 may request the IoT device 1040 to heighten a setting temperature of the boiler in the step 1063. After heightening the setting temperature of the boiler according to the IoT control request, the IoT device 1040 may respond to the smart access point 1030 in the step 1064 (IoT control response).

In a step 1065, the smart access point 1030 may perform renewal and logging of an instance state. For instance, when the IoT device 1040 heightens the setting temperature of the boiler from 15° C. to 18° C., the smart access point 1030 may renew a state of an instance corresponding to the IoT device 1040 and change a current setting temperature into 18° C. Such change in the setting temperatures may be recorded and logging may be performed.

In a step 1066, the smart access point 103 may send a response to a IoT control service to the user 1010. For instance, the smart access point 1030 may notice to the user that the setting temperature of the boiler is changed into 18° C. according to the user's request.

Figure 11:
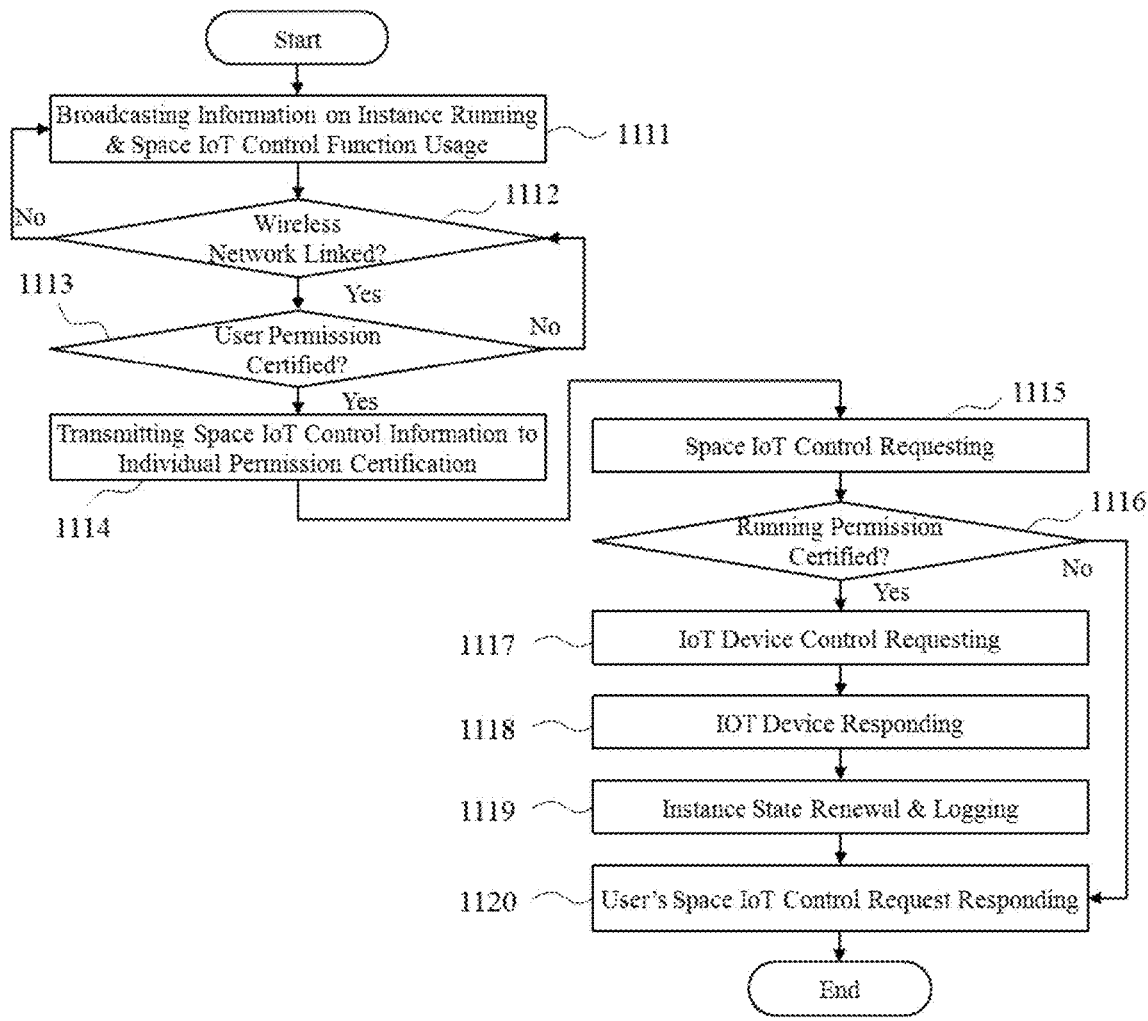
FIG. 11 is a diagram illustrating one embodiment of an operation process for a method for providing an intent-based service according to exemplary embodiments of the disclosure.

FIG. 11 is a diagram illustrating one embodiment of an operation process for a method for providing an intent-based service according to exemplary embodiments of the disclosure.

In a step 1111, a smart access point may broadcast instance running and information on usage of a space IoT control function.

In a step 1112, the smart access point may check access of the user terminal to a wireless network. When the user terminal is linked to the wireless network, a step 1113 may be performed. When the user terminal is not linked, the step 1111 may be re-performed.

In a step 1113, the smart access point may certify the user permissions. At this time, the access point may perform a step 1114 when the user permissions are certified and may re-perform the step 1112 when the user permission is not certified.

In a step 1114, the smart access point may transmit information for the space IoT control, corresponding to an individual user permission certification to the user terminal.

In a step 1115, the user terminal may request the smart access point for the space IoT control. For instance, the user terminal may identify various users' intents based on the IoT control information transmitted from the smart access point and send a message for the space IoT control request to the smart access point to control the IoT device.

In a step 1116, the smart access point may certify the permissions for the user's implementation and perform a step 1117 or a step 1020 based on presence of the permission certification for the user's implementation. For instance, when the permissions for the user's implementation are certified, the step 1117 may be performed. When the permissions are not certified, the step 1120 may be performed.

In a step 1117, the smart access point may request the IoT device for control. For instance, the smart access point may generate a message for requesting the control of the IoT device based on the space IoT control requested by the user terminal and send the generated message to the IoT device.

In a step 1118, the IoT device may respond to the request of the smart access point. For instance, the IoT device may perform operations according to the request of the smart access point and send a message to the smart access point in response to the result of the performance.

In a step 1119, the smart access point may perform renewal and logging of an instance state.

In a step 1120, the smart access point may respond to the user's space IoT control request. For instance, the smart access pint may send to the user terminal the information showing that the user's space IoT control request is performed normally and the information about the instance state changed based on the result of the performance. Alternatively, the smart access point may send to the user terminal the information showing that there are not permissions for the user's implementation, when the certification of the permissions for the user implementation is failed in the step 1116.

In the present embodiment, the permission certification and the running certification may be identified, using a security certification of a general wireless router or registration of MAC provided in the user terminal. In addition, the space IoT control information may be provided, with a web internet type.

Figure 12:
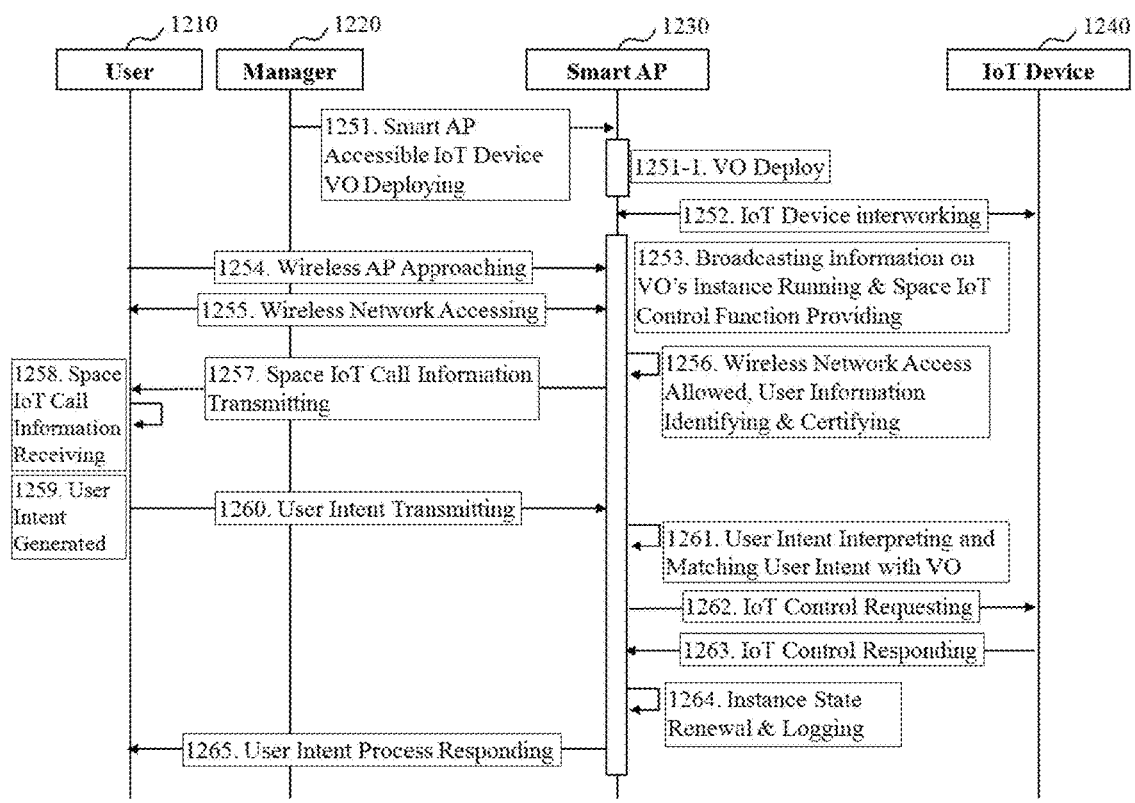
FIG. 12 is a diagram illustrating another embodiment of a method for providing an intent-based service according to exemplary embodiments of the disclosure.

FIG. 12 is a diagram illustrating another embodiment of a method for providing an intent-based service according to exemplary embodiments of the disclosure. FIG. 12 shows a user 1210, a manager 1220, a smart access point (Smart AP, 1230) and an IoT device (IoT Device 1240). The users 1210 and the manager 1220 may be the same subject or different objects. Substantially, the user 1210 and the manager 1220 may be devices used to access the smart access point 1230. A plurality of IoT devices 1240 may be provided.

In a method of providing services according to the present embodiment, the smart access 1230 may interpret and process the user's intents. Steps 1251 to 1256 are the same as the step 1051 to 1056 shown in FIG. 10 and repeated descriptions thereof are omitted accordingly.

In a step 1257, the smart access point 1230 may send information for a space IoT call to the user 1210. Different from the space IoT control information shown in FIG. 10 including the control information associated with the IoT device 1040 and the list of the intents having the addresses and the authenticators, the space IoT call information shown in FIG. 12 may include call addresses (information on the addresses used in calling a web intent) and schemas (e.g., parameters required by the calling of the web intent). The user 1010 shown in FIG. 10 may identify an intent matching the user's intent from the list of the intents and request the space IoT control based on the identified intent. In contrast, the user 1210 shown in FIG. 12 may send the user's intent to the smart access point 1230 as it is, simply using the space IoT call information. For that, in a step 1258, the user 1210 may receive the information for the space IoT calling. A step 1259 may mean a process that the user 1210 identifies an idea of the user's intent. When the user's intent is generated, the user 1210 may transmit the user's intent to the smart access point 1230 in the step 1260.

In a step 1261, the smart access point 1230 may interpret the user's intent and match the interpreted intent with a virtual object. For instance, the smart access point 1230 may search and match a corresponding virtual object to the IoT device 1240 the user desires to control, using the information including attributes, actions, types and/or values contained in the user's intent. At this time, the smart access point 1240 may understand the user's intent based on ontology and/or semantic schema proper to characteristics of the user's intent and progress mapping with a virtual object providing a corresponding service.

In a step 1262, the smart access point 1230 may request the IoT device 1240 for IoT control. In a step 1263, the IoT device 1240 may respond to the IoT control of the smart access point 1230.

In a step 1264, the smart access point 1230 may perform renewal and logging of an instance state.

In a step 1265, the smart access point 1230 may send a response to the processing of the user's intent to the user 1210.

In the embodiment, the user's permission certification may be grasped, using security certification of a general wireless router or presence of MAC registration of the user terminal.

Figure 13:
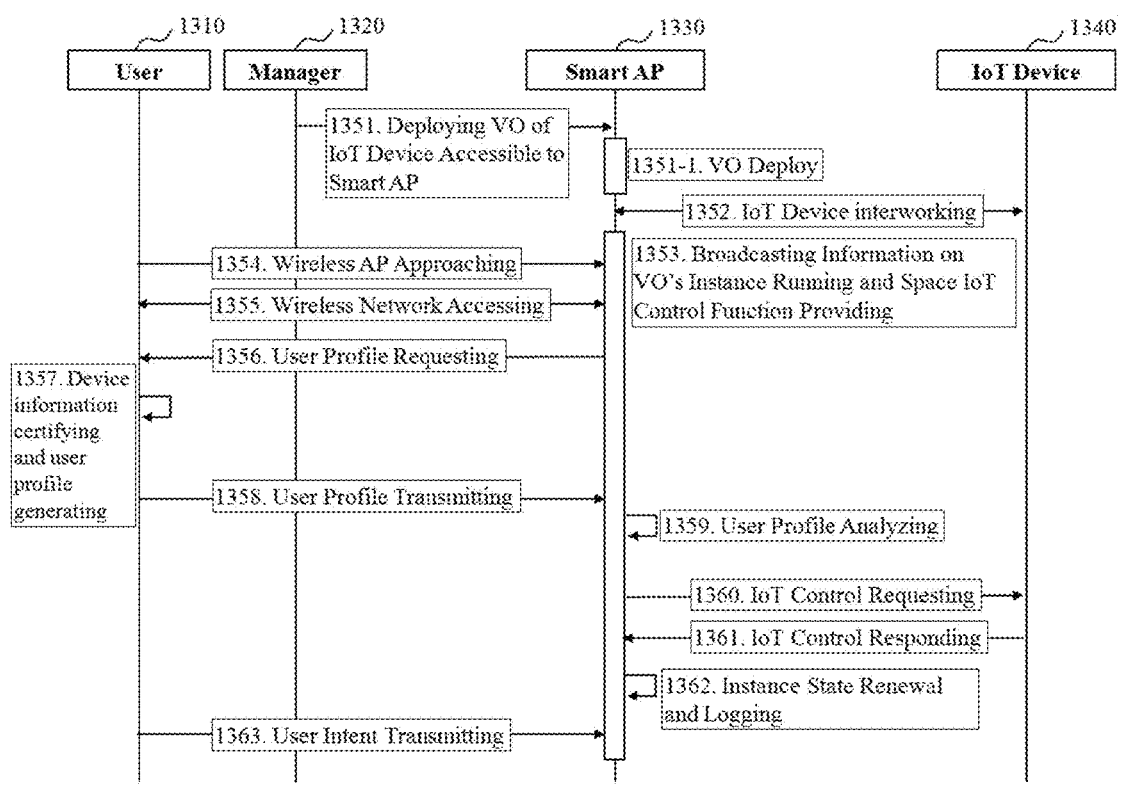
FIG. 13 is a diagram illustrating one embodiment of a method for providing a user profile based service according to exemplary embodiments of the disclosure.

FIG. 13 is a diagram illustrating one embodiment of a method for providing a user profile based service according to exemplary embodiments of the disclosure. FIG. 13 shows a user 1310, a manager 1320, a smart access point (Smart AP, 1330), and an IoT device (IoT Device, 1340). The user 1310 and the manager 1320 may be the same subject or different objects. Substantially, the user 1310 and the manager 1320 may be devices used to access the smart access point 1330. A plurality of IoT devices 1340 may be provided.

In a method of providing services according to the present embodiment, the smart access 1330 may provide services to the user 1310, using use profile information. Steps 1351 to 1355 are the same as the step 1251 to 1255 shown in FIG. 12 and repeated descriptions thereof are omitted accordingly.

In a step 1356, the smart access pint 1330 may request the user for a user profile.

In a step 1357, the user 1310 may certify device information and generate the user profile.

In a step 1358, the user 1310 may send the user profile to the smart access point 1330.

In a step 1359, the smart access point 1330 may analyze the user profile.

In a step 1360, the smart access point 1330 may request the IoT device 1340 for IoT control. In a step 1363, the IoT device 1340 may send a response to the IoT control to the smart access point 1330.

In a step 1361, the smart access point 1330 may perform renewal and logging of an instance state.

According to the present embodiment, the smart access point 1330 provides services according to the profile for an individual profile actively, even without an auxiliary instruction from the user 1310. For instance, when determining that the corresponding user are sensitive to heat based on the result of the user profile analysis (based on a history of sensing or actions for an existing boiler or air conditioner recorded in association with the corresponding user), the smart access point 1330 may control related IoT devices to turn on an air conditioner or lower a setting temperature of a boiler automatically based on the current temperature (based on temperature information provided from a temperature sensor). Alternatively, the smart access point 1330 may expect a possibility of generating a special event for each device based on a history of events. For instance, when determining that the user 1310 turns on the lightening at about 19:35 hours (1310) everyday based on the event history after the user 1310 approaches at 19:35, the smart access point 1330 may turn on the lightening even without the user's auxiliary instruction.

In a step 1362, the smart access point 1330 may receive a user's intent. At this time, the step 1362 may correspond to the step 1060 shown in FIG. 12 and the smart access point 1330 may interpret the user's intent to match the user's intent with a virtual object, such that services according to the user's intent may be further provided.

Figure 14:
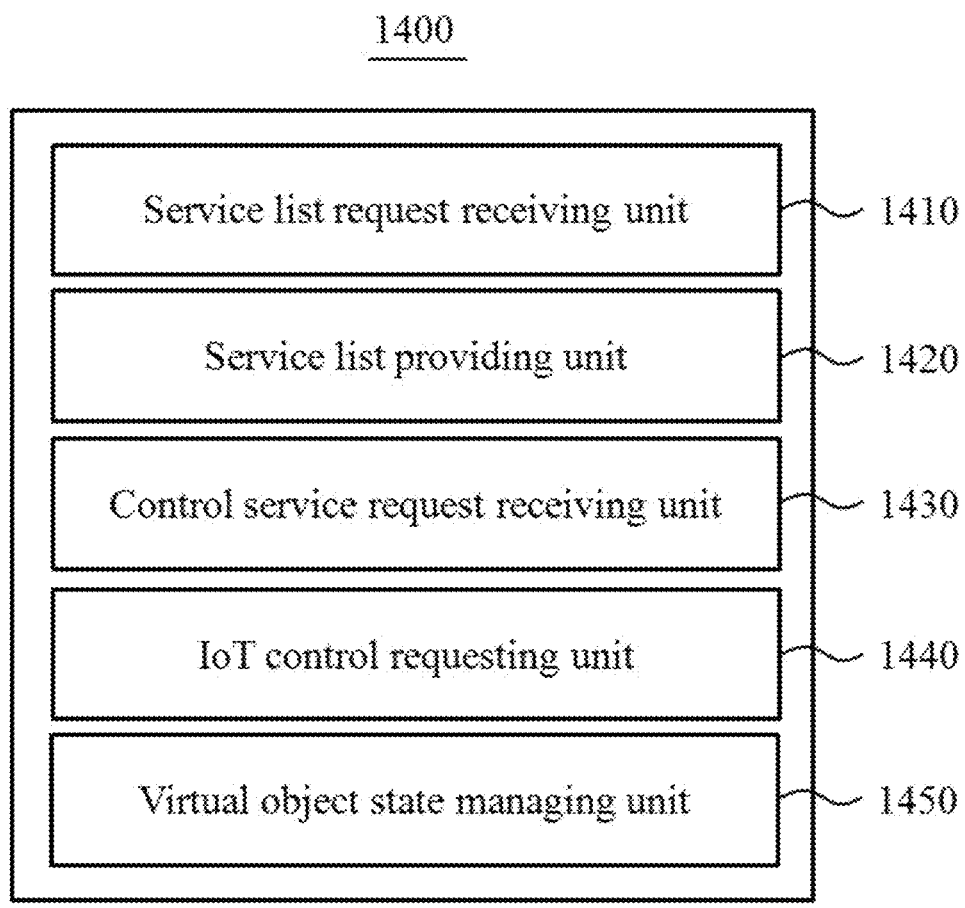
FIGS. 14, 15, 16 and 17 are block diagrams illustrating embodiments of an internal configuration provided in a smart access point apparatus according to exemplary embodiments of the disclosure.

FIG. 14 is a block diagram illustrating a first embodiment of an internal configuration provided in a smart access point apparatus according to exemplary embodiments of the disclosure. A smart access point 1400 of the present embodiment may correspond to the smart access point 830 shown in FIG. 8. As shown in FIG. 14, the smart access pint 1400 may include a service list request receiving unit 1410, a service list providing unit 1420, a control service request receiving unit 1430, an IoT control requesting unit 1440 and a virtual object state managing unit 1450 as elements composing the configuration of the smart access point. Related to the present embodiment, a method for providing services which includes a plurality of steps having processes performed by each of the elements.

The service list request receiving unit 1410 may receive the request for a list of services for one or more IoT devices provided in one space from the user terminal.

The service list providing unit 1420 may provide the user terminal with a list of virtual objects corresponding to at least one IoT device which can be provided as a service list. For instance, the service list may be provided to the user terminal through a web page having icons corresponding to the virtual objects.

The control service request receiving unit 1430 may receive a control service request generated through the service list of the user terminal.

The IoT control requesting unit 1440 may identify an IoT device corresponding to the control service request out of the one or more IoT devices and request the identified IoT device for IoT control.

The virtual object managing unit 1450 may renew a state of the virtual object corresponding to the identified IoT device based on a response from the identified IoT device and send information on the state renewal to the user terminal. For instance, the information on the state renewal may be provided to the user terminal through a web page, associated with the icons.

Figure 15:
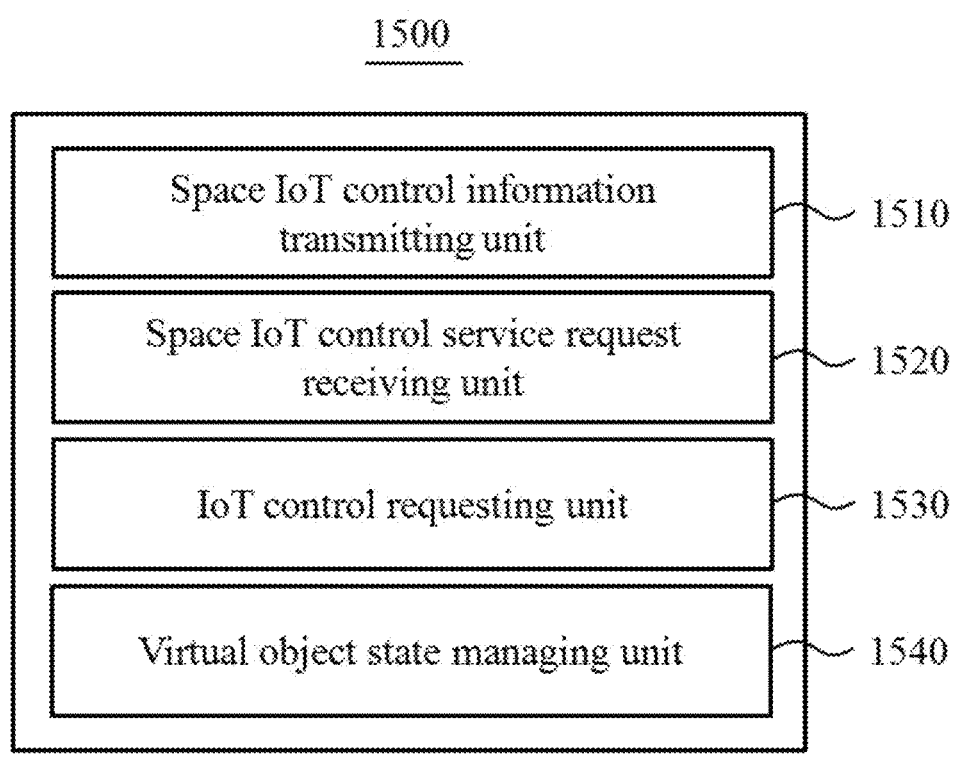

FIG. 15 is a block diagram illustrating a second embodiment of an internal configuration composing a smart access point. A smart access point 1500 according to the present embodiment may correspond to the smart access point 1030 shown in FIG. 10. The smart access point 1500 shown in FIG. 15 may include a space IoT control information transmitting unit 1510, a space IoT control service request receiving unit 1520, an IoT control requesting unit 1530 and a virtual object state managing unit 1540, as configurated elements. Related to the present embodiment, a method for providing services which includes a plurality of steps having processes performed by each of the elements.

The space IoT control information transmitting unit 1510 may transmit to user terminal information for space IoT control of one or more IoT devices provided in one space. At this time, the information for the space IoT control may include the space IoT control information for the one or more IoT devices provided in one space to the linked user terminal. At this time, the IoT control information may include a list of the control information for the one or more IoT devices and intent information having addresses.

When the intent information mapped with the user intent based on the space IoT control information is identified on the user terminal, the space IoT control service request receiving unit 1520 may receive a space IoT control service request having the intent information from the user terminal. In this instance, the intent information may be matched from the list of the intent information based on the user intent. The user intent may be generated based on the user's input to the user terminal.

The IoT control requesting unit 1530 may identify a corresponding IoT device to the request for a space IoT control service received from the one or more IoT devices and request the identified IoT device for IoT control based on the intent information.

The virtual object state managing unit 1540 may renew a state of a corresponding virtual object to the identified IoT device based on a response sent from the identified IoT device and send information on the state renewal to the user terminal.

Figure 16:
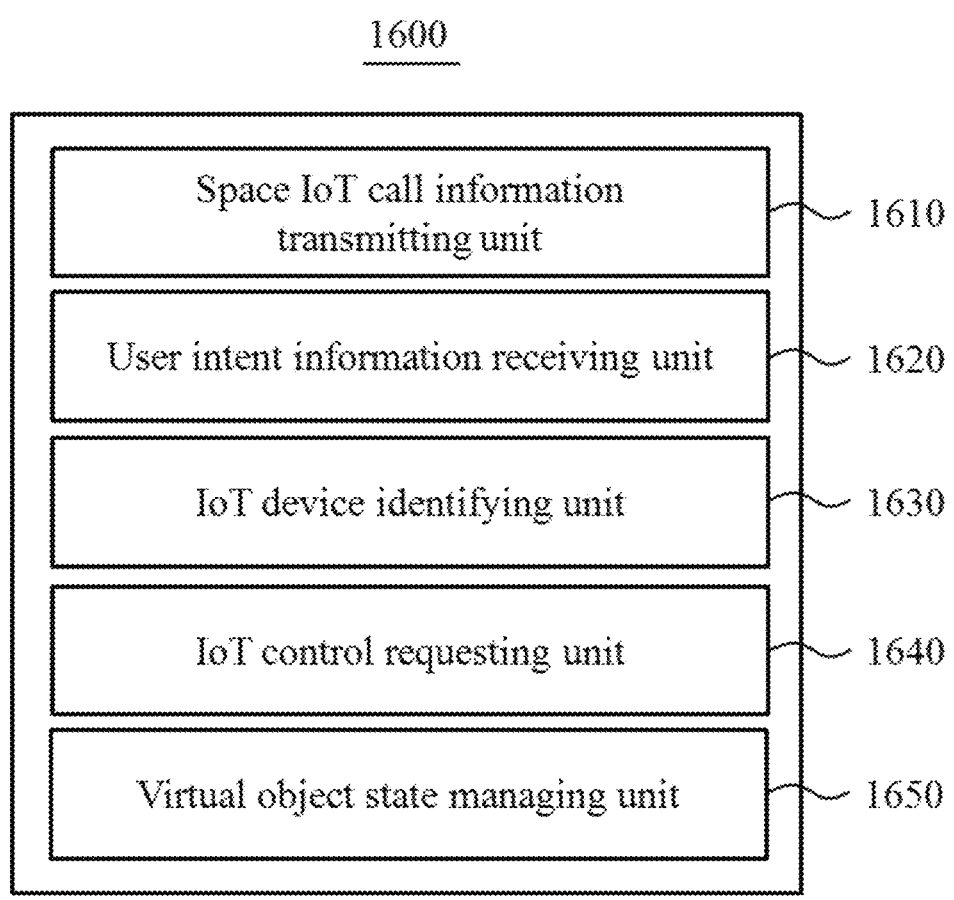

FIG. 16 is a block diagram illustrating a third embodiment of an internal configuration composing a smart access point. At this time, a smart access point 1600 according to this embodiment may correspond to the smart access point 1230 shown in FIG. 12. As shown in FIG. 16, the smart access point 1600 may include a space IoT call information transmitting unit 1610, a user intent information receiving unit 1620, an IoT device identifying unit 1630, an IoT control requesting unit 1640 and a virtual object state managing unit 1650. Related to the present embodiment, a method for providing services which includes a plurality of steps having processes performed by each of the elements.

The space IoT call information transmitting unit 1610 may transmit space IoT call information associated with one or more IoT devices provide in one space to a user terminal. The space IoT call information may include information on an address calling intent information and information on a parameter type required by the calling of the intent information.

The user intent information receiving unit 1620 may receive user intent information transmitted from the user terminal based on space IoT call information. The user intent information may include information on the intent called from an address having the space IoT call information.

The IoT device identifying unit 1630 may interpret the user intent information and identify an IoT device matched with the user intent information out of the one or more IoT devices. At this time, the user intent information may be interpreted based on ontology and/or semantic schema according to characteristics of the called intent information.

The IoT control requesting unit 1640 may request the identified IoT device for IoT control based on the user intent information.

The virtual object state managing unit 1650 may renew a state of a corresponding virtual object to the identified IoT device in a response from the identified IoT device and transmit information on the renewal of the state to the user terminal.

Figure 17:
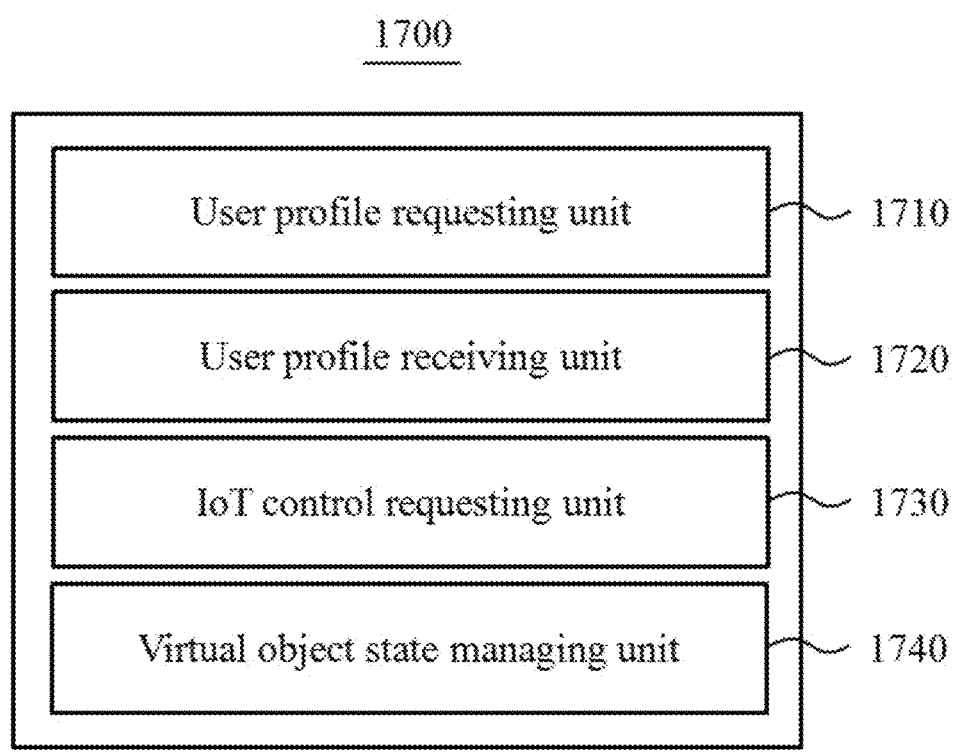

FIG. 17 is a block diagram illustrating a fourth embodiment of an internal configuration composing a smart access point. At this time, the smart access point 1700 according to the preset embodiment may correspond to the smart access point 1330 shown in FIG. 13. As shown in FIG. 17, the smart access point 1700 may include a user profile requesting unit 1710, a user profile receiving unit 1720, an IoT control requesting unit 1730 and a virtual object state managing unit 1740 as elements. Related to the present embodiment, a method for providing services which includes a plurality of steps having processes performed by each of the elements.

The user profile requesting unit 1710 may request a linked user terminal for a user profile.

The user profile receiving unit 1720 may receive the user profile from the user terminal.

The IoT control requesting unit 1730 may identify a corresponding IoT device to a result of user profile analysis out of one or more IoT devices provided in one space. After that, the IoT control requesting unit 1730 may request the identified IoT device for IoT control.

The virtual object state managing unit 1740 may renew a state of a virtual object corresponding to the identified IoT device based on a response sent from the identified IoT device.

In the embodiments shown in FIGS. 14, 15, 16 and 17, the virtual object may be deployed in the smart access point based on a request made by a manager of the smart access point as an instance representing the corresponding IoT device.

Moreover, in the embodiments, the smart access point 1400, 1500, 1600 and 1700 may further include a broadcasting unit (not shown) for broadcasting information on whether an instance of a virtual object is operated and whether the IoT control function is provided.

The smart access point 1400, 1500, 1600 and 1700 may further include a logging unit (not shown) for logging the state of the virtual object, when the state of the virtual object is changed.

The descriptions omitted in the embodiments shown in FIGS. 14, 15, 16 and 17 are referred in FIGS. 2, 3, 4, 5, 6, 7, 8, 9, 10, 11, 12 and 13.

According to the exemplary embodiments of the disclosure, the IoT devices provided in the corresponding space may be related and/or integrated and controlled based on the relation and integration.

The device mentioned above described hereinabove may be executed in any suitable device realized by hardware components, software components, and/or a combination of hardware and software components. For instance, the device and components may be realized by using one or more common computers or special purpose computers, which may include a processor, a controller, an Arithmetic Logic Unit (ALU), a digital signal processor, a microcomputer, a Field Programmable Array (FPA), a Programmable Logic Unit (PLU), a microprocessor. The device and components may implement an instruction and respond to the instruction. A processor may execute an operating system (OS) and one or more software applications running on the OS. The processor may store, process, and create data in response to the implementation of software. To make the embodiments of the disclosure understood easily, one processor may be used. It is obvious to the people skilled in the art that the processor includes a plurality of processing elements and/or a processing element having a plurality of types. For instance, the processing device may include a plurality of processors or one processor and one controller. The processing device may have a processing configuration (e.g., a parallel processor).

The software may include a computer program, a code, an algorithm, an instruction, and any combination thereof. The software may include a mechanical language code made by a compiler and a high level language code implementable by a computer, using an interpreter, and the like. The software and/or data may be permanently or temporarily embodied in a preset type of a machine, a component, a physical device, virtual equipment, a computer storage medium or device or a transmitted signal. The software may be dispersed on a computer system or through a network. The software and data may be stored or implemented in one or more computer readable recording medium.

The method according to the embodiments may be realized as program instruction implemented by various computer means and recorded in a computer readable medium. The computer readable medium may include a program command, a data file, a data structure or combination of them. The program command recorded in the medium may be configured for exemplary embodiments of the disclosure. Examples of computer readable medium include magnetic medium such as a hard disk, a floppy disk, optical medium such as CD-ROM and DVD, magneto-optical medium such as a floptical disk, and a hardware device such as ROM, RAM, and a flash memory. The hardware device may be configured to execute one or more software modules to implement the exemplary embodiments. The software may include a computer program, a code, an algorithm, an instruction, and any combination thereof. The software may include a mechanical language code made by a compiler and a high level language code implementable by a computer, using an interpreter, and the like. The software may be dispersed on a computer system or through a network. The software and data may be stored or implemented in one or more computer readable recording medium.

It will be apparent to those skilled in the art that various modifications and variations can be made in the present disclosure without departing from the spirit or scope of the disclosed subject matter.

Thus, it is intended that the present disclosure cover the modifications and variations of the disclosed subject matter provided they come within the scope of the appended claims and their equivalents.

What is claimed is:

1. A method for providing, using a smart access point communicating with one or more Internet of Things (IoT) devices provided in one space, a service in an IoT environment comprising:
    receiving, at the smart access point, a request for a service list from a user terminal;
    providing, at the smart access point, a list of virtual objects which are able to be provided out of virtual objects corresponding to the one or more IoT devices to the user terminal as the service list;
    receiving, at the smart access point, a control service request generated from the service list of the user terminal;
    at the smart access point, identifying an IoT device corresponding to the control service request and requesting the identified IoT device for IoT control;
    at the smart access point, renewing a state of a virtual object corresponding to the identified IoT device based on a response of the identified IoT device and transmitting information on the state renewal to the user terminal;
    logging, at the smart access point, a state of the virtual object as an event history of the IoT device corresponding to the virtual object, when a state of the virtual object is changed; and
    further requesting, at the smart access point, the IoT device corresponding to the virtual object for IoT control based on the event history.

2. The method for providing the service in the IoT (Internet of Things) environment of claim 1, wherein the service list is provided to the user terminal through a web page comprising icons corresponding to the virtual object, and the information on the state renewal is provided to the user terminal through the web page in relation with the icons.

3. The method for providing the service in the IoT (Internet of Things) environment of claim 1, wherein the virtual object as an instance representing a corresponding IoT device is deployed in the smart access point based on a request made by a manager of the smart access point.

4. The method for providing the service in the IoT (Internet of Things) environment of claim 1, further comprising:
    broadcasting information on whether an instance of the virtual object is operated and whether the IoT control function is provided.

5. The method for providing the service in the Internet of Things (IoT) environment of claim 1, wherein the further request the IoT device corresponding to the virtual object for IoT control is performed without communication with the user terminal.

6. A smart access point communicating with one or more Internet of Things (IoT) devices provided in one space of an IoT comprising:
    a service list request receiving unit configured to receive a request of a service list for the one or more IoT devices from a user terminal;
    a service list providing unit configured to provide the user terminal with a list of virtual objects corresponding to the one or more IoT devices which can be provided as the service list;
    a control service request receiving unit configured to receive a control service request generated through the service list of the user terminal;
    an IoT control requesting unit configured to identify an IoT device corresponding to the control service request out of the one or more IoT devices and to request the identified IoT device for IoT control; and
    a virtual object managing unit configured to renew a state of the virtual object corresponding to the identified IoT device based on a response from the identified IoT device and send information on the state renewal to the user terminal,
    wherein the smart access point is configured to log a state of the virtual object as an event history of the IoT device corresponding to the virtual object, when a state of the virtual object is changed, and further configured to request the IoT device corresponding to the virtual object for IoT control based on the event history.

7. The smart access point of claim 6, wherein the service list is provided to the user terminal through a web page comprising icons corresponding to the virtual object, and the information on the state renewal is provided to the user terminal through the web page in relation with the icons.

8. The smart access point of claim 6, wherein the smart access point is further configured to request the IoT device corresponding to the virtual object for IoT control based on the event history without communication with the user terminal.

* * * * *